(12) United States Patent
Altoonian et al.

(10) Patent No.: US 6,403,020 B1
(45) Date of Patent: Jun. 11, 2002

(54) METHOD FOR FIRING CERAMIC CORES

(75) Inventors: Mark A. Altoonian, Morristown; Randall D. Runions, Newport, both of TN (US)

(73) Assignee: Howmet Research Corporation, Whitehall, MI (US)

(*) Notice: Subject to any disclaimer, the term of this patent is extended or adjusted under 35 U.S.C. 154(b) by 0 days.

(21) Appl. No.: 09/923,919

(22) Filed: Aug. 7, 2001

(51) Int. Cl.⁷ .............................................. C04B 33/32
(52) U.S. Cl. .................... 264/671; 264/234; 264/605
(58) Field of Search ................ 264/671, 605, 264/234

(56) References Cited

U.S. PATENT DOCUMENTS

| | | | |
|---|---|---|---|
| 4,209,478 A | * 6/1980 | Wooten et al. | 264/65 |
| 4,767,479 A | 8/1988 | Ferguson et al. | 156/89 |
| 5,014,763 A | 5/1991 | Frank | 164/15 |
| 5,249,618 A | 10/1993 | Burkarth et al. | 164/24 |
| 5,273,104 A | 12/1993 | Renaud et al. | 164/529 |
| 5,295,530 A | 3/1994 | O'Connor et al. | 164/516 |
| 5,296,308 A | 3/1994 | Caccavale et al. | 428/586 |
| 5,394,932 A | 3/1995 | Carozza et al. | 164/137 |
| 5,656,217 A | 8/1997 | Rogers et al. | 264/640 |
| 5,735,335 A | 4/1998 | Gilmore et al. | 164/516 |
| 5,853,044 A | 12/1998 | Wheaton et al. | 164/516 |
| 5,864,743 A | 1/1999 | Tuchinskiy et al. | 419/2 |
| 5,977,007 A | 11/1999 | Lassow et al. | 501/152 |
| 6,152,211 A | 11/2000 | Klug et al. | 164/518 |

* cited by examiner

*Primary Examiner*—Christopher A. Fiorilla

(57) ABSTRACT

A method for firing a ceramic core includes placing the ceramic core on a setter, placing at least one flexible refractory bag containing refractory particulates on the core to apply a force on the core toward the setter during firing, and then heating the ceramic core on the setter to an elevated superambient firing temperature. Heating of the ceramic core with the flexible weight bag(s) thereon conforms the core to a surface of the setter to reduce distortion of the core and improve yields of cores within preselected dimensional tolerances.

16 Claims, 3 Drawing Sheets

METHOD FOR FIRING CERAMIC CORES

FIELD OF THE INVENTION

The present invention relates to a method for firing ceramic cores for use in the casting of molten metallic materials.

BACKGROUND OF THE INVENTION

Most manufacturers of gas turbine engines are evaluating advanced investment cast turbine airfoils (i.e. turbine blade or vane) which include intricate air cooling channels to improve efficiency of airfoil internal cooling to permit greater engine thrust and provide satisfactory airfoil service life. Internal cooling passages are formed in the cast airfoils using one or more thin airfoil shaped ceramic cores positioned in a ceramic shell mold where the molten metal is cast in the mold about the core. After the molten metal solidifies, the mold and core are removed to leave a cast airfoil with one or more internal passages where the cores formerly resided.

The ceramic core is typically made using a plasticized ceramic compound comprising ceramic flour, binder and various additives. The ceramic compound is injection molded, transfer molded or poured at elevated temperature in a core die or mold. When the green (unfired) core is removed from the die or mold, it typically is placed between top and bottom setters to cool to ambient temperature before core finishing and gauging operations and firing at an elevated sintering temperature. The green ceramic core is fired at elevated (superambient) temperature in one or more steps to sinter and strengthen the core for use in casting metallic material, such as a nickel base or cobalt base superalloy. U.S. Pat. No. 5,014,763 discloses a green ceramic core positioned top and bottom setters during firing.

The green core can exhibit distortion from stresses induced in the core from the molding and/or ambient cooling operations. Distortion can be a particular problem with respect to the airfoil region of the core have a trailing edge with a relatively thin cross-section that is prone to distortion. As a result, the green ceramic cores can exhibit dimensional variations from one core to the next in a production run of cores. Moreover, the green core may be improperly contacted by the top or bottom setter such that dimensional variations from one core to the next occur in a production run.

An object of the present invention is to provide a method of firing ceramic cores in a manner to reduce dimensional variations and improve yield of ceramic cores that meet dimensional tolerances.

SUMMARY OF THE INVENTION

In an illustrative embodiment of the invention, a method for firing a ceramic core comprises placing an unfired (green) or previously fired ceramic core having a molded core shape on a setter, placing at least one flexible refractory bag containing refractory particulates on the ceramic core to apply a force on the core toward the setter during firing, and then heating the ceramic core on the setter to an elevated superambient firing temperature to sinter and strengthen the core for use in casting metallic material. Heating of the ceramic core with the flexible weight bag(s) thereon pursuant to the invention helps conform the core to a surface of the setter to reduce dimensional distortion of the core and improve yields of cores within preselected dimensional tolerances. Preferably, a plurality of the flexible refractory bags of selected weight are placed on the core at orientations and locations found effective to reduce dimensional variation of the core from print dimensions. The ceramic core can be treated pursuant to the invention in the unfired (green) condition or in a fired condition.

In a particular embodiment of the invention, the flexible bag comprises a ceramic fiber cloth bag that contains a ceramic grog (e.g. ceramic particulates). The bag prevents spreading of the grog particulates during firing and prevents chemical reaction between the grog particulates and the core. The bag can be in the configuration of a tubular sock having opposite ends that are closed after the sock is filled with the grog by a respective metallic wire or ceramic string that can withstand the temperature of firing.

The invention is beneficial for, although not limited to, firing a relatively large ceramic core that includes an airfoil region that is prone to distortion. For example only, the invention is beneficial for firing ceramic cores used in the investment casting of airfoils (e.g. turbine blades and vanes) of land-based and aero gas turbine engines.

DESCRIPTION OF THE INVENTION

The present invention is described herebelow for purposes of illustration only with respect to manufacture of ceramic cores made by conventional poured core molding, injection molding, transfer molding, or other core-forming techniques where a plasticized ceramic compound is introduced into a core die or mold. Conventional poured core molding involves mixing one or more ceramic flours (e.g. alumina, silica, zircon, and/or zirconia fluor), a liquid binder such as catalytically cured ethyl silicate liquid binder, and other additives, pouring the mixture in a die, and applying pressure until the binder cures/hardens, and then removing the green core from the die. The green core then is subjected to a flaming treatment where the green core is impinged with an alcohol flame to increase green core strength before being subjected to a high temperature sintering (firing) treatment to sinter and strengthen the core for use in casting metallic material, such as a nickel base or cobalt base superalloy. An injection or transfer molded ceramic core is molded by injecting a ceramic compound comprising one or more ceramic powders (e.g. alumina, silica, zircon, and/or zirconia flour), an organic binder (e.g. a thermosetting binder material, thermoplastic or cross-linking thermoplastic binder material, and mixtures thereof) and various additives at elevated temperature into a die at superambient die temperature to form a green core. The particular ceramic powders, organic binders and additives for making the core can be selected from conventional materials available and used to this end and form no part of this invention. An unfired (green) ceramic core can be treated pursuant to the invention. In addition, a previously fired ceramic core can be further treated pursuant to the invention. For example, when a poured ceramic core is subjected to two or more firing treatments, some or all of the firing treatments can be carried out pursuant to the invention using the flexible refractory bag(s).

For purposes of illustration and not limitation, the invention is described herebelow with respect to manufacture of ceramic cores for use in investment casting of gas turbine airfoils, such as turbine blades and vanes. Such airfoils typically are investment cast using nickel base superalloys and cobalt base superalloys and are cast to have an equiaxed grain microstructure or directionally solidified microstructure comprising columnar grains or a single crystal. The invention is especially useful, although not limited, in manufacture of relatively large ceramic cores for use in investment casting of airfoils for land-based gas turbine engines wherein the cores can have lengths greater than about 6 inches, such as for example in the range of 6 inches to 42 inches and greater.

Figure 1:
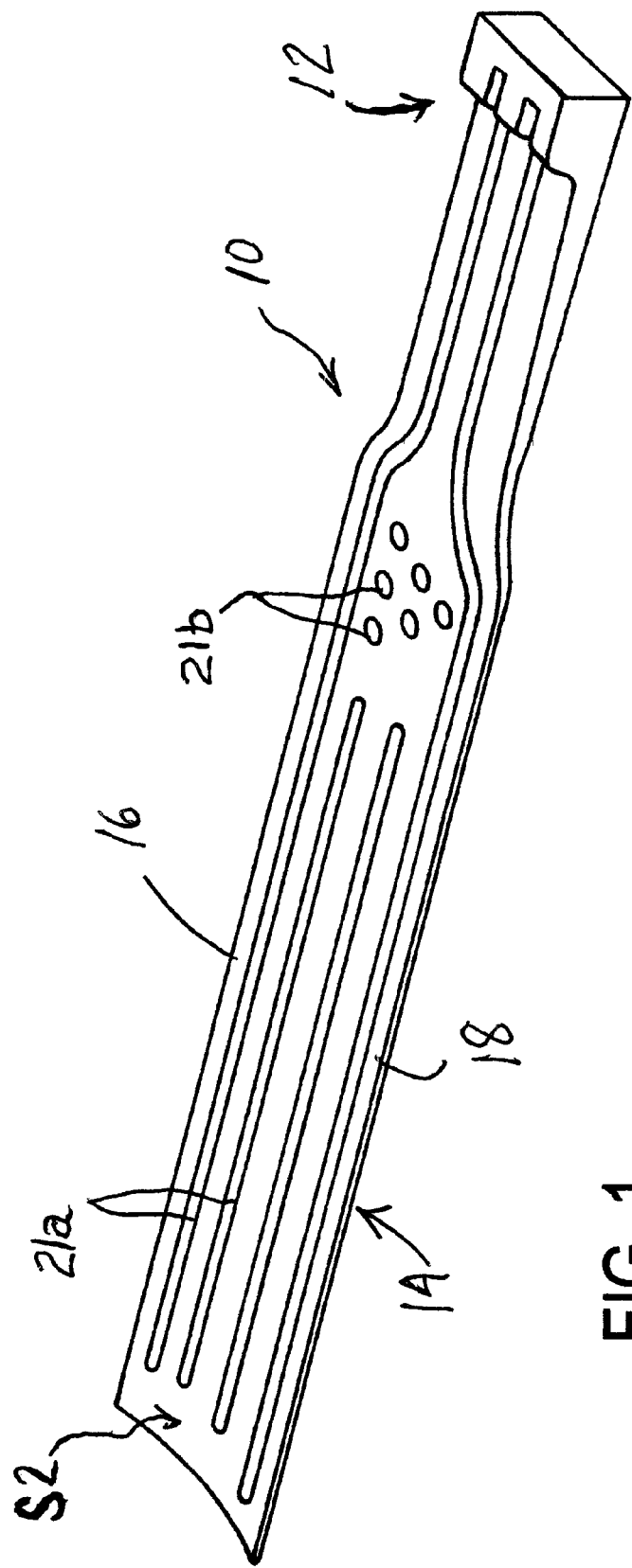
FIG. 1 is a perspective view of a typical green (unfired) or fired airfoil ceramic core that can be fired pursuant to the invention.
Figure 2:
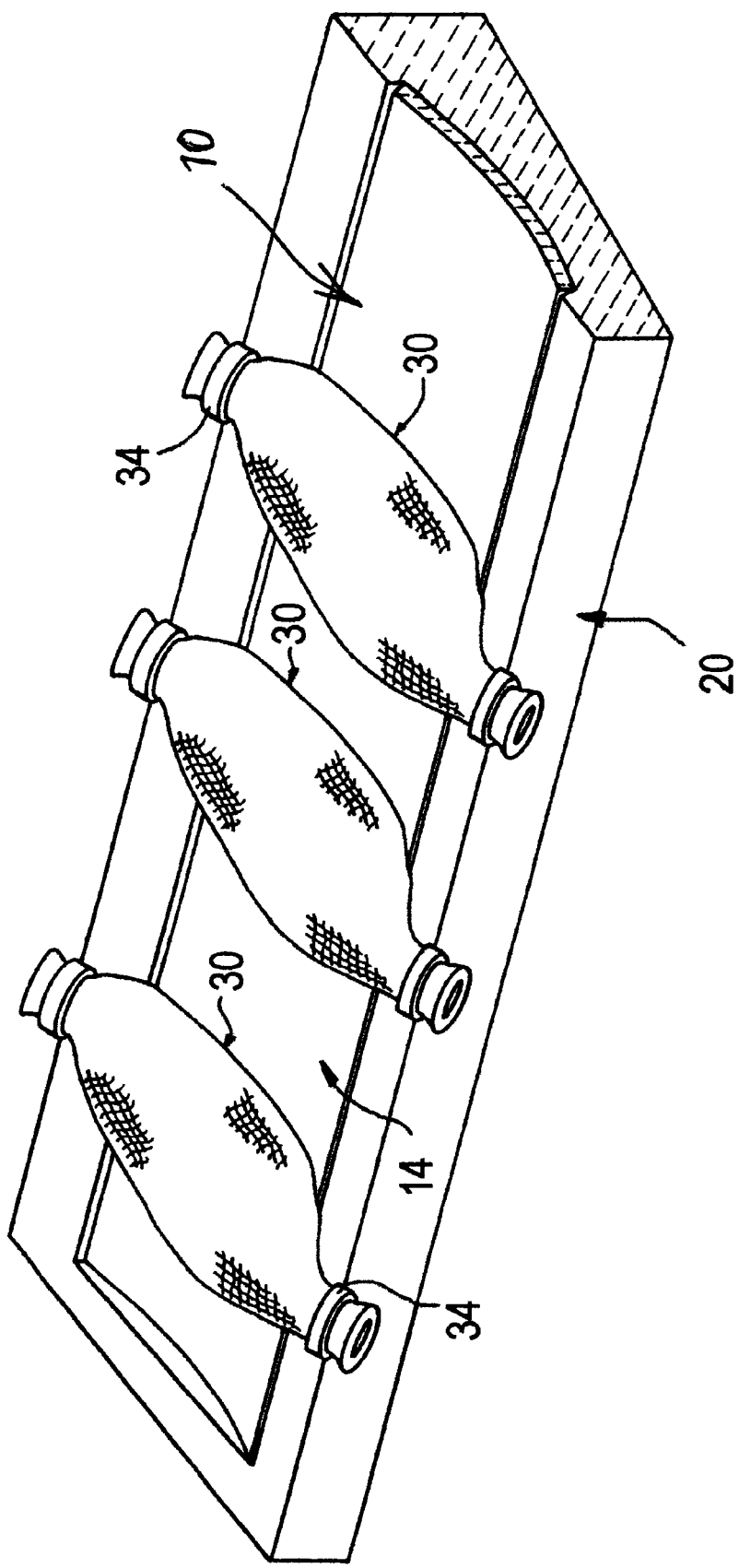
FIG. 2 is a perspective view of the airfoil ceramic core disposed on a bottom setter with a plurality of flexible weight bags thereon pursuant to an embodiment of the invention. The slots and openings shown in the core of FIG. 1 are omitted from FIG. 2 for convenience.
Figure 3:
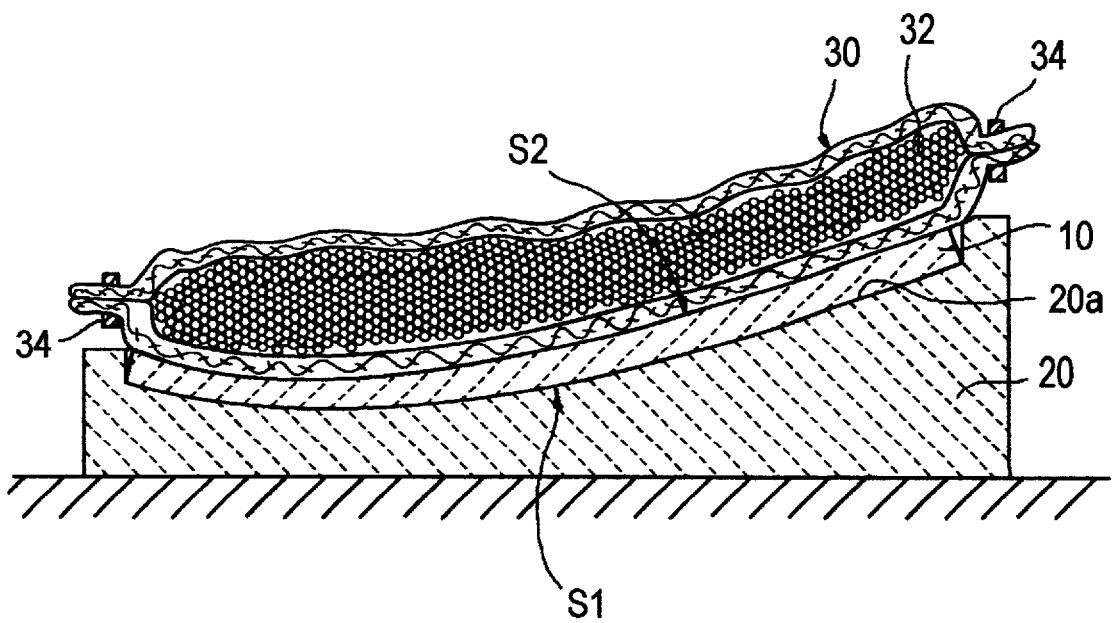
FIG. 3 is a sectional view of the airfoil on the setter of FIG. 2.

Referring to FIGS. 1–3, for purposes of illustration and not limitation, an illustrative green (unfired) ceramic core 10 removed from a core die or mold (not shown) is shown schematically and configured for use in casting a nickel or cobalt base superalloy gas turbine engine blade. The green core 10 comprises a root region 12 and an airfoil region 14. The airfoil region 14 includes a leading edge 16 and a trailing edge 18 having a relatively thin cross-section. Openings 21b and/or slots 21a of various configurations and dimensions can be provided through the core 10 to form elongated walls, rounded pedestals, and other features in the interior of the cast turbine blade as is well known. The openings and/or slots 21b, 21a are omitted from FIG. 2 for convenience. The core 10 includes a convex side S1 and an opposite concave side S2 as is well known for turbine airfoil cores. The sides S1, S2 typically include complex surface features such as ribs, pedestals, turbulators, and the like. The trailing edge 18 typically tapers to a very thin edge that is prone to warp or curl or otherwise distort.

Referring to FIGS. 2 and 3, the unfired (green) core 10 is shown positioned on an upwardly facing, core-receiving setter surface 20a of a rigid bottom setter 20. The green core 10 can be positioned on the setter 20 when the core is still at an elevated molding temperature (e.g. 90 to 300 degrees F) following removal from the core die or mold, or after the green core 10 cools to room temperature. In lieu of a green core, the core 10 can comprise one that has been previously fired as part of a multiple firing schedule, such as may be used for poured ceramic cores.

The rigid bottom setter 20 may comprise metal, plastic (e.g REN plastic available from Ciba Geigy Company) ceramic or other relatively rigid/stiff material. The setter 20 includes core-receiving surface 20a that has a preselected desired profile or contour to which the proximate side S1 of the green ceramic core 10 can conform. For example, the setter surface 20a is shown in FIGS. 2 and 3 having a preselected airfoil contour to receive the airfoil region 14 of the core 10 thereon. The setter surface 20a typically has a flat contour in that the surface does not include surface details, such as pedestals, turbulators, and the like, that may be present on the airfoil region 14 of the core 10.

In practicing an embodiment of the method of the invention to fire a silica-based core 10, one or more flexible refractory weight bags 30 containing refractory particulates 32 is/are placed on the upwardly facing side S2 of the core 10 to apply a generally uniformly distributed force (due to its weight) on the core toward the setter surface 20a during firing to promote conformation of the core side S1 to the setter surface 20a during core firing in the range of 1600 to 2100 degrees F for example only. Each weight bag 30 is flexible so that the bag can conform to the upper surface of the core 10 to distribute and apply a force (gravity weight force) to the core toward the setter surface 20a while also allowing gases from the core material to pass through the bag. Each bag 30 can be made of a woven ceramic (e.g. silica or alumina) fiber cloth commercially available as Kaotex cloth from Thermal Ceramics, Augusta, Ga. A flat sheet of the ceramic fiber cloth is folded over on to itself, and the adjacent folded-over edges of the cloth ar stitched together using silica or alumina fiber to form a tube bag or sock 30. The invention is not limited to the particular ceramic fiber cloth bag or sock as other refractory or ceramic materials may be employed to fabricate flexible weight bags 30 for containing the ceramic particulates 32 at the temperature of firing and that do not react with the core material during firing.

In firing a silica-based core 10, the refractory particulates 32 comprise alumina grog which comprises sintered alumina particles having a sieve size of 3 to 6 (sieve size is according to U.S. Standard Sieve). Such alumina grog particles typically have diameters of about ¼ inch. Alumina grog of this type is commercially available from Aluchem, Reading, Ohio. The invention is not limited to the alumina grog as other refractory or ceramic particulates 32 may be contained in the weight bags 30. The refractory or ceramic particulates 32 are chosen so not to sinter together at the particular temperature and time of the core firing operation.

The flexible tubular weight bags 30 are filled manually or by machine with an appropriate weight of particulates 32, and the open ends of the bags 30 are tied off (closed) using metallic wire or ceramic string ties 34 that can withstand the temperature/time of firing to secure and maintain the bags closed. Typically, one end of bag 30 is tied off using a first tie 34 and then the bag is filled with particulates 32 through the remaining open end followed by closing off the remaining open end using a second tie 34. Suitable ties 34 can comprise Ni—Cr thermocouple wire, or platinum or platinum alloy thermocouple wire, that is twisted about the opposite ends of the bags 30 to form the end closures. The bags 30 prevent spreading out of the particulates 32 therein during firing and prevent chemical reaction between the particulates 32 and the core 10.

Although FIG. 2 shows three bags 30 positioned transverse to and spaced apart along the long axis of the core 10, these bag positions relative to the core are offered only for purposes of illustration and not limitation. In practicing the invention, the orientations and locations of the bags 30 on the core 10 are determined empirically for each particular core design to promote core conformance to setter surface 20a and thereby reduce dimensional variation of the core 10 from desired print dimensions. For example, different core configurations may have different regions that do not inherently conform as closely as desired to the setter surface 20a due to core shrinkage, distortion, and other reasons. As a result, in practicing the invention, the bags 30 can be oriented transverse to the long axis of the core 10 as shown in FIG. 2, and/or they can be oriented parallel to the long axis, and/or at any angle thereto as needed and determined empirically by trial and error to achieve conformance of a particular core 10 to the setter surface 20a. Each bag 30 applies a uniformly distributed force on the core 10 to this end.

Similarly, the number and weight of the bags 30 (in addition to bag orientations and locations on the core 10) are determined empirically for each particular core design to promote core conformance to setter surface 20a and thereby reduce dimensional variation of the core 10 from desired print dimensions. The weights of the bags 30 can be different at different locations on the core 10 to this same end. For purposes of illustration and not limitation, the weights of the three bags 30 shown each can be approximately 1.5 pounds.

In practicing an embodiment of the method of the invention, the ceramic core 10 on the setter 20 with weight bag(s) 30 positioned on the core is fired in a conventional kiln to an elevated superambient firing temperature to sinter the ceramic core particles together and strengthen the core for use in casting metallic material. For firing a silica-based green ceramic core, the maximum core firing temperature can be in the range of 1600 to 2100 degrees F depending upon core composition conducted. Firing can be conducted in an air atmosphere in the kiln. The core 10 typically is subjected to a conventional firing cycle involving a heat-up stage, hold-at-maximum firing temperature stage, and cool-down stage for an aggregate time period of several hours to several days. The heating rate to the maximum firing temperature typically is about 10 to about 75 degrees C per hour for a silica-based core for purposes of illustration only.

Firing of the ceramic core 10 with the flexible weight bag(s) 30 thereon pursuant to the invention promotes conformance of the core to surface 20a of the setter 20 to reduce core dimensional variations and has improved yields of fired ceramic cores that are within preselected (blueprint) dimensional tolerances. After firing, the weight bag(s) 30 can be reused in the firing of other cores 10.

It will be apparent to those skilled in the art that variations can be made in the embodiments of the invention described without departing from the scope of the invention set forth in the claims.

We claim:

1. A method of firing a ceramic core, comprising placing said core on a setter, placing at least one flexible refractory bag containing refractory particulates on said core to apply a force on said core toward said setter, and heating said core to an elevated superambient firing temperature.

2. The method of claim 1 wherein a plurality of said bags are placed on said core at different orientations relative to said core.

3. The method of claim 1 wherein a plurality of said bags are placed on said core at different locations on said core.

4. The method of claim 1 wherein a plurality of said bags having different weights are placed on said core.

5. The method of claim 1 wherein said at least one bag comprises ceramic fiber cloth.

6. The method of claim 5 wherein said at least one bag comprises a tubular bag configuration.

7. The method of claim 6 wherein opposite ends of said tubular bag configuration are closed by a respective tie.

8. The method of claim 7 wherein said tie comprises a metallic wire or ceramic string.

9. The method of claim 1 wherein said refractory particulates comprise sintered ceramic particles.

10. The method of claim 9 wherein said ceramic particles comprise alumina particles.

11. The method of claim 9 wherein said alumina particles have a sieve size of 3 to 6.

12. The method of claim 1 wherein said setter includes a surface having an airfoil contour and said core has an airfoil-shaped region received on said surface of said setter.

13. The method of claim 12 wherein said core has a length greater than about 6 inches.

14. The method of claim 1 including the further step of reusing said at least one bag to fire another said core.

15. The method of claim 1 wherein said ceramic core is an unfired core.

16. The method of claim 1 wherein said ceramic core is a fired core.

* * * * *